United States Patent
Rieland et al.

(10) Patent No.: US 9,822,257 B2
(45) Date of Patent: Nov. 21, 2017

(54) DISSOLVABLE FILMS AND METHODS OF USING THE SAME

(71) Applicant: Crayola, LLC, Easton, PA (US)

(72) Inventors: Elizabeth Rieland, Easton, PA (US); Leena Vadaketh, Doylestown, PA (US); Cheryl Krieger, Bangor, PA (US); Eric Shuler, Easton, PA (US)

(73) Assignee: Crayola LLC, Easton, PA (US)

( * ) Notice: Subject to any disclaimer, the term of this patent is extended or adjusted under 35 U.S.C. 154(b) by 29 days.

(21) Appl. No.: 14/415,662

(22) PCT Filed: Nov. 1, 2012

(86) PCT No.: PCT/US2012/062952
§ 371 (c)(1),
(2) Date: Jan. 19, 2015

(87) PCT Pub. No.: WO2014/018075
PCT Pub. Date: Jan. 30, 2014

(65) Prior Publication Data
US 2015/0175810 A1    Jun. 25, 2015

Related U.S. Application Data

(60) Provisional application No. 61/674,605, filed on Jul. 23, 2012.

(51) Int. Cl.
*B44C 1/00*    (2006.01)
*C09D 5/06*    (2006.01)

(52) U.S. Cl.
CPC . *C09D 5/06* (2013.01); *B44C 1/00* (2013.01)

(58) Field of Classification Search
CPC ............... C09D 5/06; B44C 1/00; B44C 1/105
USPC .......... 524/386, 43; 106/162.82, 174.1, 194.2
See application file for complete search history.

(56) References Cited

U.S. PATENT DOCUMENTS

| | | |
|---|---|---|
| 3,640,741 A | 2/1972 | Etes |
| 4,076,547 A | 2/1978 | Lester |
| 5,206,026 A | 4/1993 | Sharik |
| 5,336,306 A | 8/1994 | Hughes |
| 5,393,528 A | 2/1995 | Staab |
| 5,393,529 A | 2/1995 | Hoffmann |
| RE34,988 E | 7/1995 | Yang |
| 5,474,805 A | 12/1995 | Vaughn |
| 5,629,003 A | 5/1997 | Horstmann |
| 5,700,478 A | 12/1997 | Biegajski |
| 5,806,284 A | 9/1998 | Gifford |
| 5,914,357 A | 6/1999 | Nakamura |
| 5,948,430 A | 9/1999 | Zerbe |
| 5,981,737 A | 11/1999 | Manuszak-Guerrini |
| 5,985,012 A | 11/1999 | Nakamura |
| 6,074,664 A | 6/2000 | Roreger |
| 6,165,499 A | 12/2000 | Kleinsorgen |
| 6,531,208 B2 | 3/2003 | Chung |
| 6,596,298 B2 | 7/2003 | Leung |
| 6,599,519 B1 | 7/2003 | Seo |
| 6,899,890 B2 | 5/2005 | Kirschner |
| 6,946,501 B2 | 9/2005 | Kochvar |
| 7,097,851 B1 | 8/2006 | Takada |
| 7,332,230 B1 | 2/2008 | Krumme |
| 7,434,692 B2 | 10/2008 | Ginsberg |
| 7,500,984 B2 | 3/2009 | Fuisz |
| 7,579,019 B2 | 8/2009 | Tapolsky |
| 7,595,065 B2 | 9/2009 | Dodds |
| 7,595,392 B2 | 9/2009 | Kumar |
| 7,612,048 B2 | 11/2009 | Pinna |
| 7,759,317 B2 | 7/2010 | Belgorod |
| 2004/0126408 A1 | 7/2004 | Kabra |
| 2004/0253434 A1 | 12/2004 | Patel |
| 2005/0031674 A1 | 2/2005 | Redmond |
| 2005/0118217 A1 | 6/2005 | Barnhart |
| 2005/0136096 A1 | 6/2005 | Davidson |
| 2005/0186256 A1 | 8/2005 | Dihel |
| 2006/0039957 A1 | 2/2006 | Krumme |
| 2006/0073190 A1 | 4/2006 | Carroll |
| 2006/0198873 A1 | 9/2006 | Chan |
| 2006/0198878 A1 | 9/2006 | Krumme |
| 2006/0222708 A1 | 10/2006 | Krumme |
| 2007/0009606 A1 | 1/2007 | Serdy |
| 2007/0059346 A1 | 3/2007 | Maibach |
| 2007/0082048 A1 | 4/2007 | Warner |
| 2007/0087036 A1 | 4/2007 | Durschlag |
| 2007/0098779 A1 | 5/2007 | Hanzen |
| 2007/0122455 A1 | 5/2007 | Myers |
| 2007/0155774 A1 | 7/2007 | Moormann |

(Continued)

FOREIGN PATENT DOCUMENTS

| | | |
|---|---|---|
| WO | 9928113 | 6/1999 |
| WO | 2008108940 | 9/2008 |

(Continued)

OTHER PUBLICATIONS

International Preliminary Report on Patentability and Written Opinion for International Application No. PCT/US2012/062952 dated Jan. 27, 2015.

(Continued)

*Primary Examiner* — Edward Cain
(74) *Attorney, Agent, or Firm* — RatnerPrestia

(57) ABSTRACT

The present invention provides dissolvable films for customizing art materials, such as inks, paints, and modeling doughs. The invention also provides methods and kits for delivering artistic effects to art materials. The dissolvable films comprise one or more cellulose compounds, propylene glycol, glycerin, and one or more artistic components. The dissolvable film imparts an artistic effect following administration of the film to the art material. In exemplary embodiments, the artistic components of the film comprise one or more colorants which provide a coloring effect. A kit for delivering one or more artistic effects to an art material includes dissolvable films of various colors and shapes, and one or more art materials, such as ink, paint, or modeling dough.

28 Claims, No Drawings

(56) References Cited

U.S. PATENT DOCUMENTS

| | | |
|---|---|---|
| 2007/0190157 A1 | 8/2007 | Sanghvi |
| 2007/0269651 A1 | 11/2007 | Denome |
| 2007/0298087 A1 | 12/2007 | Biegajski |
| 2008/0014231 A1 | 1/2008 | Okano |
| 2008/0038326 A1 | 2/2008 | Drew |
| 2008/0081071 A1 | 4/2008 | Sanghvi |
| 2008/0091233 A1 | 4/2008 | Ellis-Behnke |
| 2008/0103102 A1 | 5/2008 | Belgorod |
| 2008/0131635 A1 | 6/2008 | Ono |
| 2008/0214429 A1 | 9/2008 | Macquarrie |
| 2008/0292683 A1 | 11/2008 | Sanghvi |
| 2008/0299050 A1 | 12/2008 | Bortz |
| 2009/0004254 A1 | 1/2009 | Maibach |
| 2009/0087486 A1 | 4/2009 | Krumme |
| 2009/0098188 A1 | 4/2009 | Staab |
| 2009/0186797 A1 | 7/2009 | Panandiker |
| 2009/0208559 A1 | 8/2009 | Drew |
| 2009/0230013 A1 | 9/2009 | Born |
| 2009/0253754 A1 | 10/2009 | Selmin |
| 2009/0263467 A1 | 10/2009 | Joshi |
| 2009/0291123 A1 | 11/2009 | Hoffmann |
| 2009/0297585 A1 | 12/2009 | Meyers |
| 2009/0301504 A1 | 12/2009 | Worthen |
| 2010/0029790 A1 | 2/2010 | Lombardo |
| 2010/0040727 A1 | 2/2010 | Myers |
| 2010/0047322 A1 | 2/2010 | Hoffmann |
| 2010/0112050 A1 | 5/2010 | Ryoo |
| 2010/0172956 A1 | 7/2010 | Kalili |
| 2010/0183524 A1 | 7/2010 | Zielinski |
| 2010/0215774 A1 | 8/2010 | Maibach |
| 2011/0033541 A1 | 2/2011 | Myers |
| 2011/0052699 A1 | 3/2011 | Funke |
| 2011/0086070 A1 | 4/2011 | Talwar |
| 2011/0097405 A1 | 4/2011 | Funke |
| 2012/0258902 A1* | 10/2012 | Parrish ................ C11D 3/0052 510/296 |

FOREIGN PATENT DOCUMENTS

| | | |
|---|---|---|
| WO | 2008127902 | 10/2008 |
| WO | 2008137832 | 11/2008 |
| WO | 2008157228 | 12/2008 |
| WO | 2010033611 | 3/2010 |
| WO | 2010114822 | 10/2010 |
| WO | 2010146601 | 12/2010 |
| WO | 2010150219 | 12/2010 |
| WO | 2010150221 | 12/2010 |
| WO | 2011020610 | 2/2011 |
| WO | 2011028495 | 3/2011 |

OTHER PUBLICATIONS

International Search Report for International Application No. PCT/US2012/062952 dated Apr. 4, 2013.

Australian Examination Report for Australian Application No. 2012385956, dated Jun. 30, 2016, 3 pages.

* cited by examiner

DISSOLVABLE FILMS AND METHODS OF USING THE SAME

CROSS-REFERENCE TO RELATED APPLICATIONS

This application is a U.S. National Phase filing of International Application No. PCT/US2012/062952, filed Nov. 1, 2012, which claims the benefit of priority of U.S. Provisional Application No. 61/674,605, filed Jul. 23, 2012, the entire contents of which applications are incorporated by reference herein, in their entireties and for all purposes.

FIELD OF THE INVENTION

The present invention relates generally to dissolvable films for customizing art products.

BACKGROUND OF THE INVENTION

Many different types of arts and crafts products have been introduced over time, including inks, paints, and modeling compounds. Typically, these products are manufactured and packaged in their final form, complete with their own colors, scents, and textures. There remains a need for novel systems that enable a user to customize arts and crafts products, such as inks, paints, and modeling compounds, with artistic effects of their own choosing. Such systems would provide the creative experience of selecting and adjusting the colors, textures, and scents of the materials used in making artistic creations.

SUMMARY OF THE INVENTION

An embodiment of the present invention provides a dissolvable film for customizing an art material, the dissolvable film comprising one or more cellulose compounds, propylene glycol, glycerin, and one or more artistic components, wherein the dissolvable film imparts an artistic effect to the art material following administration of the dissolvable film to the art material. In exemplary embodiments, the one or more artistic components comprise one or more colorants, and the artistic effect is a coloring effect.

Another embodiment of the present invention provides a method for delivering one or more artistic effects to an art material comprising administering one or more dissolvable films to the art material, wherein the one or more dissolvable films impart an artistic effect on the art material. In particular embodiments, each of the one or more dissolvable films comprises one or more cellulose compounds, propylene glycol, glycerin, and one or more colorants.

Another embodiment of the present invention provides a kit for delivering one or more artistic effects to an art material comprising dissolvable films for use in customizing an art material. In particular embodiments, the kit also includes one or more art materials selected from the group consisting of ink, paint, modeling dough, and casting resin.

DETAILED DESCRIPTION OF THE INVENTION

The present invention provides dissolvable films for use by children and artists, particularly for use as a children's craft product. The dissolvable films are formulated for customizing art materials with particular effects, such as inks, paints, modeling doughs, and casting resins. The dissolvable films function as effect carriers that enable a user to add "artistic effects" of their choosing to a variety of art materials.

As used herein, the term "artistic effect" refers to an effect that is preferably selected from the group consisting of color, scent, texture, glitter, pattern, and combinations thereof. Thus, when a dissolvable film imparts an artistic effect to an art material, the dissolvable film preferably imparts a color, a scent, a texture, glitter, a pattern, or a combination thereof to the art material. In preferred embodiments, the artistic effect is a coloring effect. Similarly, an "artistic component" as used herein is a component of the dissolvable film that is preferably selected from the group consisting of a colorant, a scent, a texture, a pattern, glitter, and a combination thereof. Upon dissolution, or substantial dissolution, of the film in an art material, the artistic component becomes dispersed in the art material, which causes a corresponding artistic effect to be imparted on the art material (e.g., a red colorant contained in a film becomes dispersed in a paint or modeling compound, causing at least a portion of the paint or modeling compound to turn red). In exemplary embodiments, the artistic component(s) comprise one or more colorants.

As used herein, the term "film" refers to a solid, sheet-like material that may also be referred to as a "strip." The films are typically thin enough that in some cases they are fragile and can be easily torn. According to certain embodiments, the film has a thickness of greater than 70 µm, for example, about 80 µm, about 85 µm, or about 90 µm. In preferred embodiments, the film has a thickness of greater than 90 µm, for example, about 100 µm or about 110 µm. The films are also dissolvable, which means they are water soluble and capable of dissolving in water-based liquids and materials (e.g., water-based art materials such as inks, paints, and modeling doughs). As used herein, a percentage (%) refers to a weight percentage of the composition.

The sizes of the films, such as the length and width, can vary greatly. The films may be small, e.g. about 1 cm×about 1 cm, or may be as large as a sheet of paper, e.g. about 22 cm×about 28 cm. The films may have a length and/or width of greater than about 3 cm, greater than about 4 cm, greater than about 5 cm, or greater than about 6 cm. For example, the films may have a length and/or width of about 2 cm, about 3 cm, about 4 cm, about 5 cm, about 6 cm, about 7 cm, about 8 cm, about 9 cm, about 10 cm, about 11 cm, or about 12 cm. In particular embodiments, the films can have a variety of shapes, including but not limited to squares, circles, rectangles, triangles, or stars. In certain applications, the shape of the film may remain substantially intact after the film dissolves in the art material. For example, a user may apply a star-shaped film directly to wet paint that has already been painted onto a substrate (i.e., painted onto a substantially flat surface). The star pattern (which may impart a color or glitter to the paint) will slowly dissolve in the paint while substantially maintaining the star shape. In other applications, the film is "mixed in" to the art material such that the film's shape is not retained upon dissolution of the film. For example, the film may be added to a container of paint and the paint is subsequently stirred, which causes the components of the film to become mixed into the paint. In either type of application, the film imparts an artistic effect upon the art material (e.g., color, scent, texture, glitter, pattern, or combination thereof).

The present invention also provides kits that comprises dissolvable films of the present invention. For example, the kit may include one or more art materials or "base" arts and crafts products (e.g., an unpigmented ink, paint, or modeling compound) and a variety of dissolvable films that have various colors, scents, textures, and/or patterns. The user creates a custom arts and crafts product by blending one or more dissolvable strips, or portions thereof, in the base product. A wide variety of colors and effects are thus available to the user. Examples of art materials or "base" arts and crafts products include modeling compounds (e.g., Model Magic® or Silly Putty®), water-based paints and inks, and tie-dye kits. Examples of dissolvable films that may be included in kits of the present invention include films having colorants that are red, orange, yellow, green, blue, or purple, films that contain glitter, and films that are shaped into squares, circles, triangles, rectangles, stars, or hearts.

Dissolvable films currently exist in food applications (such as breath strips) and in drug applications, in which the films carry active pharmaceutical ingredients. In many of those applications, the films are formulated for oral delivery, i.e., to dissolve in a person's mouth. On the contrary, the films of the present invention are not formulated for oral or mucosal delivery; for example, the films of the present invention do not contain any pharmaceutical ingredients, food ingredients, or taste-enhancing substances, such as sweeteners. Advantageously, there are numerous ingredients in other commercially available films (i.e., those used in food or drug applications) which are preferably not included in films of the present invention. For example, in preferred embodiments, the films of the present invention do not contain any pullulan, starch, modified starch (e.g., maltodextrin), or starch derivatives.

According to particular aspects, the present invention provides dissolvable films for use in customizing an art material, each dissolvable film comprising one or more cellulose compounds, propylene glycol, glycerin, and one or more artistic components, wherein the dissolvable film imparts one or more artistic effects on the art material following administration of the dissolvable film to the art material. The resulting artistic effect(s) imparted on the art material correspond to the artistic component(s) contained in the film (e.g., a colorant imparts a color on the art material, a scent imparts a scent on the art material, glitter imparts glitter on the art material, etc.). The artistic component(s) may comprise, for example, one or more colorants, one or more scents, one or more textures, one or more patterns (e.g., shapes), or glitter. The artistic effect(s) may therefore comprise, for example, a color, scent, texture, glitter, pattern, or a combination thereof, imparted on the art material. In an exemplary embodiment, the artistic component(s) comprise or consist of one or more colorants.

The one or more cellulose compounds comprise, for example, hydroxypropyl methylcellulose or hydroxyethylcellulose. In exemplary embodiments, the cellulose compound(s) comprise or consist of hydroxypropyl methylcellulose. The cellulose compound(s) also preferably comprise at least two different types or grades of hydroxypropyl methylcellulose; for example, the dissolvable strip may comprise two types of hydroxypropyl methylcellulose that each has a different viscosity, such as Metolose 60SH-50® (hypromellose, USP sub type 2910) and Pharmacoat 615® (hypromellose, USP sub type 2910). Metolose 60SH-50® has a viscosity of about 45 cP to about 55 cP (e.g., about 50 cP), a methoxyl content of about 28% to about 30%, and a hydroxypropoxyl content of about 7% to about 12%. Pharmacoat 615® has a viscosity of about 12 cP to about 18 cP (e.g., about 15 cP), a methoxyl content of about 28% to about 30%, and a hydroxypropoxyl content of about 7% to about 12%. In a preferred embodiment, the dissolvable film further comprises one or more non-ionic surfactants, preferably polysorbate 80.

Colorants of the film may comprise, for example, dry pigments, liquid pigment dispersions, and dry and liquid dyes that include but are not limited to direct dyes, acid dyes, and fabric reactive dyes. The colorant(s) preferably comprise either liquid pigment dispersions (i.e., comprising pigment(s) and water) or dry pigments. In an embodiment of a film comprising a liquid pigment dispersion, the dissolvable film comprises about 5% to about 20% hydroxypropyl methylcellulose, about 0.1% to about 10% propylene glycol, about 0.1% to about 5% glycerin, about 5% to about 30% pigment, and about 50% to about 90% water. In another embodiment, the dissolvable film comprises about 7% to about 15% hydroxypropyl methylcellulose, about 1% to about 5% propylene glycol, about 0.5% to about 3% glycerin, about 10% to about 20% pigment, and about 60% to about 80% water. In an exemplary embodiment, the dissolvable film comprises about 10.5% hydroxypropyl methylcellulose (e.g., Metolose 60SH-50® and Pharmacoat 615®), about 3% propylene glycol, about 1.05% glycerin, about 15% pigment, and about 70% water.

According to certain aspects of the present invention, the dissolvable film preferably consists of one or more cellulose compounds (e.g., hydroxypropyl methylcellulose), propylene glycol, glycerin, one or more non-ionic surfactants (e.g., polysorbate 80), one or more artistic components (e.g., one or more colorants), water, and one or more optional additives.

In an embodiment of a film comprising a dry pigment, the dissolvable film comprises about 25% to about 50% hydroxypropyl methylcellulose, about 1% to about 20% propylene glycol, about 0.5% to about 10% glycerin, and about 30% to about 70% pigment. In another embodiment, the dissolvable film comprises about 30% to about 40% hydroxypropyl methylcellulose, about 5% to about 15% propylene glycol, about 1.0% to about 5% glycerin, and about 40% to about 60% pigment. In an exemplary embodiment, the dissolvable film comprises about 35% hydroxypropyl methylcellulose (e.g., Metolose 60SH-50® and Pharmacoat 615®), about 10% propylene glycol, about 3.5% glycerin, and about 50% pigment.

According to certain aspects of the present invention, the dissolvable film preferably consists of one or more cellulose compounds (e.g., hydroxypropyl methylcellulose), propylene glycol, glycerin, one or more non-ionic surfactants (e.g., polysorbate 80), one or more artistic components (e.g., one or more colorants), and one or more optional additives. Optional additives of the film may be selected from the group consisting of pH adjusters, buffers, dispersing agents, preservatives, emulsifiers, thickening agents, and combinations thereof.

According to particular embodiments, a method for delivering one or more artistic effects to an art material comprises administering one or more dissolvable films of the present invention (i.e., those described herein) to the art material, wherein the one or more dissolvable films impart an artistic effect on the art material. The art material is preferably water-based, and is preferably selected from the group consisting of inks, paints, modeling doughs, and casting resins. According to one embodiment, the user administers multiple (i.e., two or more) dissolvable films to the art material. The user may alternatively divide a film into smaller portions (e.g., by tearing or cutting) and administer the smaller portions to an art material. The dissolvable films of the present invention are manufactured according to methods known to those of ordinary skill in the art.

The following examples are provided to describe the invention in greater detail and are intended to illustrate, not limit, the invention.

Examples

While only certain compositions are set forth below, alternative compositions will be apparent to those skilled in the art. Such artisans will be able to modify the compositions with an eye toward the desired performance properties and intended use.

Each of the tables below provides two types of strips—one containing a pigment (i.e., a dry powder), referred to under "% solids," and the other containing a liquid pigment dispersion, referred to under "% liquid blend":

TABLE 1

Ingredients

| Material Name | Alternate Description | % Liquid Blend | % Solids |
|---|---|---|---|
| Metolose 60SH-50 | Hypromellose, USP sub. type 2910 | 6.00 | 20.00 |
| Pharmacoat 615 | Hypromellose, USP sub. type 2910 | 4.50 | 15.00 |
| Propylene Glycol | Propylene Glycol | 3.00 | 10.00 |
| Glycerin | Glycerol | 1.05 | 3.50 |
| Polysorbate 80 | Tween 80 | 0.45 | 1.50 |
| Blue #52-4442-0-000 | Blue Dry Pigment (Crayola supplied) | 15.00 | 50.00 |
| purified water, usp | purified water, usp | 70.00 | — |

TABLE 2

Ingredients

| Material Name | Alternate Description | % Liquid Blend | % Solids |
|---|---|---|---|
| Metolose 60SH-50 | Hypromellose, USP sub. type 2910 | 6.00 | 20.00 |
| Pharmacoat 615 | Hypromellose, USP sub. type 2910 | 4.50 | 15.00 |
| Propylene Glycol | Propylene Glycol | 3.00 | 10.00 |
| Glycerin | Glycerol | 1.05 | 3.50 |
| Polysorbate 80 | Tween 20 | 0.45 | 1.50 |
| #10-1100-7-042 Flexiverse Blue 15:3 | Blue Liquid Dye (Crayola supplied) | 15.00 | 50.00 |
| purified water, usp | purified water, usp | 70.00 | — |

As an example, one film containing a dry pigment is added per 0.5 oz of a white Model Magic® product. As another example, one strip is added to anywhere from 5 to 30 μm (1 oz) of a fabric paint base having the following composition:

| Component | Fabric Paint Base % | |
|---|---|---|
| Deionized Water | 15.06 | |
| Propylene Glycol | 3.80 | |
| Nalco 2305 | 0.16 | defoamer |
| AC 2612 | 71.92 | acrylic polymer-film former |
| Tamol 731 | 0.55 | dispersant |
| Triton X-405 | 2.60 | surfactant |
| AMP 95 | 0.53 | amino alcohol dispersant and ph stabilizer |

| Component | Fabric Paint Base % | |
|---|---|---|
| Acrysol TT-615 | 1.26 | acrylic thickener |
| Acrysol ASE-60 | 1.26 | acrylic thickener |
| Paraplex-R WP-1 | 2.52 | plasticizer |
| Reputain B30 | 0.22 | Preservative |
| Polyphase AF-1 | 0.11 | Preservative |
| Total | 100.00 | |

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed is:

1. A dissolvable film configured to customize an art material, the dissolvable film comprising one or more cellulose compounds, propylene glycol, glycerin, and one or more artistic components, wherein:
the dissolvable film is configured to impart an artistic effect to the art material following administration of the dissolvable film to the art material,
the one or more artistic components comprise one or more liquid pigment dispersions comprising pigment and water, and
the art material is water-based.

2. The dissolvable film of claim 1, wherein the one or more artistic components are selected from the group consisting of one or more colorants, one or more scents, one or more textures, one or more patterns, glitter, and combinations thereof.

3. The dissolvable film of claim 1, wherein the one or more cellulose compounds comprise hydroxypropyl methylcellulose.

4. The dissolvable film of claim 1, wherein the one or more cellulose compounds comprise at least two different grades of hydroxypropyl methylcellulose.

5. The dissolvable film of claim 1 further comprising one or more non-ionic surfactants.

6. The dissolvable film of claim 5, wherein the one or more non-ionic surfactants comprise polysorbate 80.

7. The dissolvable film of claim 1 comprising about 5% to about 20% hydroxypropyl methylcellulose, about 0.1% to about 10% propylene glycol, about 0.1% to about 5% glycerin, about 5% to about 30% pigment, and about 50% to about 90% water.

8. The dissolvable film of claim 1 comprising about 7% to about 15% hydroxypropyl methylcellulose, about 1% to about 5% propylene glycol, about 0.5% to about 3% glycerin, about 10% to about 20% pigment, and about 60% to about 80% water.

9. The dissolvable film of claim 1 comprising about 10.5% hydroxypropyl methylcellulose, about 3% propylene glycol, about 1.05% glycerin, about 15% pigment, and about 70% water.

10. The dissolvable film of claim 1 consisting of one or more cellulose compounds, propylene glycol, glycerin, one or more non-ionic surfactants, one or more liquid pigment dispersions, water, and one or more optional additives.

11. A dissolvable film configured to customize an art material, the dissolvable film comprising one or more cellulose compounds, propylene glycol, glycerin, and one or more artistic components, wherein:
the dissolvable film is configured to impart an artistic effect to the art material following administration of the dissolvable film to the art material,
the one or more artistic components comprise one or more dry pigments, and
the art material is water-based.

12. The dissolvable film of claim 11 comprising about 25% to about 50% hydroxypropyl methylcellulose, about 1% to about 20% propylene glycol, about 0.5% to about 10% glycerin, and about 30% to about 70% pigments.

13. The dissolvable film of claim 11 comprising about 30% to about 40% hydroxypropyl methylcellulose, about 5% to about 15% propylene glycol, about 1.0% to about 5% glycerin, and about 40% to about 60% pigments.

14. The dissolvable film of claim 11 comprising about 35% hydroxypropyl methylcellulose, about 10% propylene glycol, about 3.5% glycerin, and about 50% pigments.

15. The dissolvable film of claim 11 consisting of one or more cellulose compounds, propylene glycol, glycerin, one or more non-ionic surfactants, one or more dry pigments, and one or more optional additives.

16. The dissolvable film of claim 1 further comprising one or more additives selected from the group consisting of pH adjusters, buffers, dispersing agents, preservatives, emulsifiers, thickening agents, and combinations thereof.

17. The dissolvable film of claim 1, wherein the dissolvable film has a thickness of greater than 70 µm.

18. A method for delivering one or more artistic effects to an art material comprising administering one or more dissolvable films to the art material, wherein the one or more dissolvable films is configured to impart an artistic effect on the art material, and wherein the art material is water-based.

19. The method of claim 18, wherein each of the one or more dissolvable films comprises one or more cellulose compounds, propylene glycol, glycerin, and one or more artistic components.

20. The method of claim 19, wherein the one or more artistic components comprise one or more colorants.

21. The method of claim 19, wherein the art material is selected from the group consisting of ink, paint, modeling dough, and casting resin.

22. The method of claim 18 comprising administering multiple dissolvable films to the art material.

23. The method of claim 19, wherein the one or more cellulose compounds comprise hydroxypropyl methylcellulose.

24. The method of claim 20, wherein one or more colorants are liquid pigment dispersions comprising pigment and water.

25. The method of claim 24, wherein the one or more dissolvable films comprise about 5% to about 20% hydroxypropyl methylcellulose, about 0.1% to about 10% propylene glycol, about 0.1% to about 5% glycerin, about 5% to about 30% pigment, and about 50% to about 90% water.

26. The method of claim 20, wherein the one or more colorants are dry pigments.

27. The method of claim 26, wherein the one or more dissolvable films comprise about 25% to about 50% hydroxypropyl methylcellulose, about 1% to about 20% propylene glycol, about 0.5% to about 10% glycerin, and about 30% to about 70% pigment.

28. A kit for delivering one or more artistic effects to an art material comprising a dissolvable film configured to customize an art material, wherein:
the dissolvable film is configured to impart an artistic effect to the art material following administration of the dissolvable film to the art material,
the dissolvable film comprises one or more cellulose compounds, propylene glycol, glycerin, and one or more colorants,
the art material is selected from the group consisting of ink, paint, modeling dough, and casting resin, and
the art material is water-based.

* * * * *